June 7, 1938.  F. C. GRISWOLD  2,120,068
FISHLINE REEL
Filed May 7, 1936  2 Sheets-Sheet 2
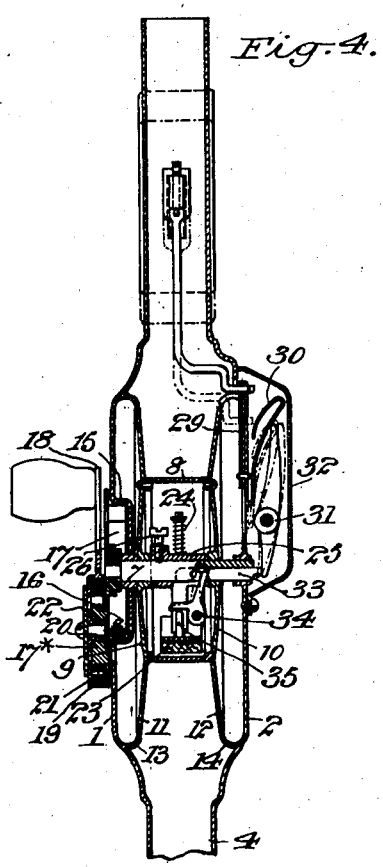
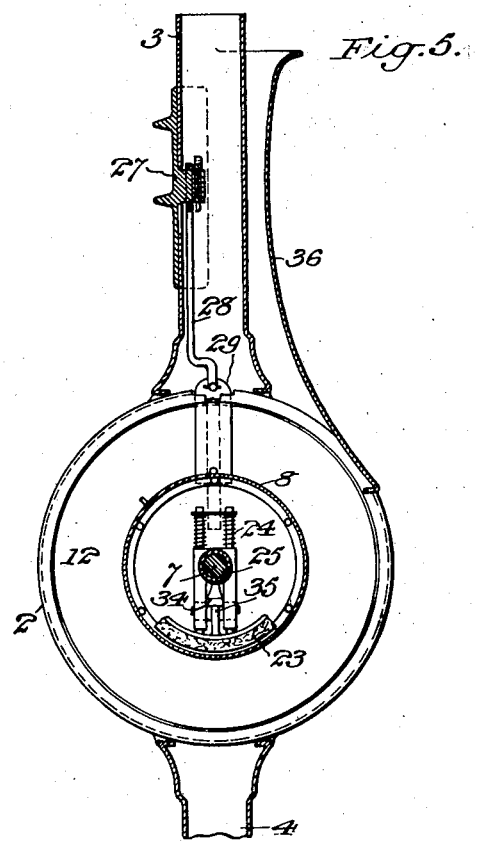
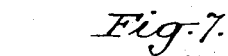
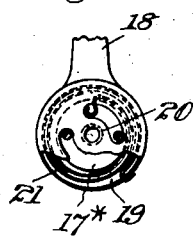
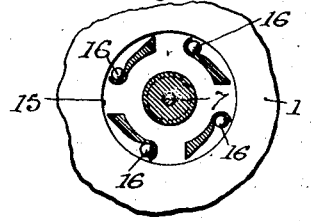
INVENTOR
Frederick C. Griswold
BY
ATTORNEYS Patented June 7, 1938

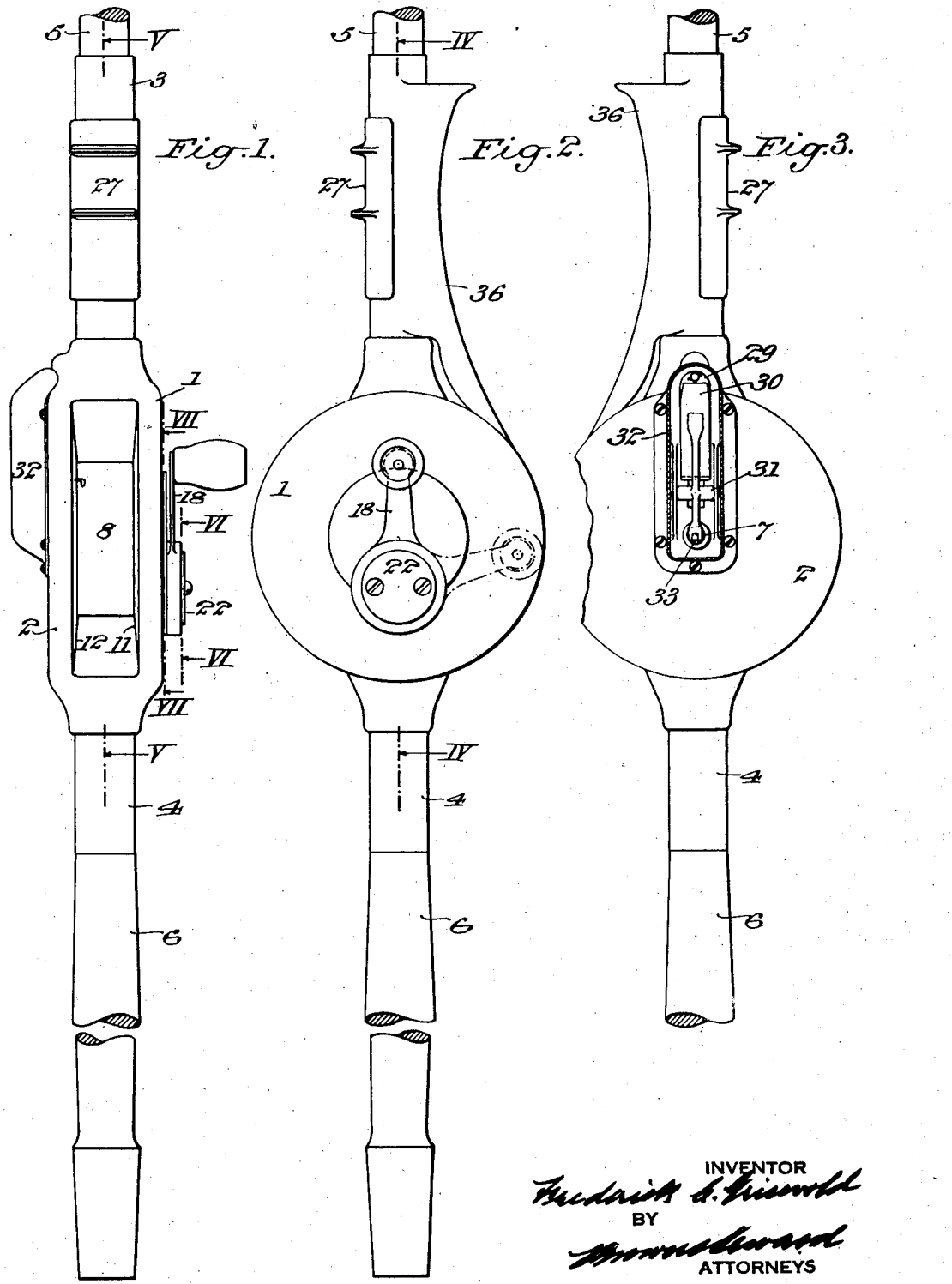

2,120,068

UNITED STATES PATENT OFFICE 2,120,068

FISHLINE REEL

Frederick C. Griswold, Port Jefferson, N. Y.

Application May 7, 1936, Serial No. 78,305

21 Claims. (Cl. 242—84.5)

My invention relates to that type of fish line reel which connects the fore and butt portions of a fishing rod.

The object of my invention is to produce a novel fish line reel which will be simple, strong and rigid and in which only two controls for the reel are necessary, one being a novel manually operated friction clutch for controlling the reel spool and the other a hand crank which, when operated in winding, automatically increases its leverage on the spool as the pull on the line increases.

A further object is to provide certain improvements in the various parts of the reel whereby its effectiveness is materially enhanced.

My invention comprises a fish line reel in which there are provided both a manually operated friction clutch for connecting the spool to the cross shaft on which it is rotatably mounted, and also means for locking the cross shaft to the reel casing against reverse rotation.

A practical embodiment of my invention is represented in the accompanying drawings, in which Fig. 1 represents a detail top plan view of the reel and its adjoining fore and butt portions of the rod;

Fig. 2 represents a detail view of one side of the same, the hand crank being shown in full lines in its normal fully retracted position, and in dotted lines in its fully extended position;

Fig. 3 represents a detail view of the opposite side of the reel and its adjacent rod portions, the housing for some of the spool friction clutch operating parts being shown in section;

Fig. 4 represents a longitudinal central section, taken in the plane of the line IV—IV of Fig. 2, looking in the direction of the arrows;

Fig. 5 represents a longitudinal section, taken in the plane of the line V—V of Fig. 1, looking in the direction of the arrows;

Fig. 6 represents a detail section, partly broken away, taken in the plane of the line VI—VI of Fig. 1, looking in the direction of the arrows; and Fig. 7 represents a detail section, taken in the plane of the line VII—VII of Fig. 1, looking in the direction of the arrows.

The reel casing comprises, generally, the side plates 1 and 2 and the front and rear radially alined tubular extensions 3 and 4, which extensions are fitted to receive the fore and butt portions 5 and 6 of a fishing rod. The reel casing thus forms a connection between the said portions of the fishing rod.

A cross shaft 7 which intersects the longitudinal axis of the fishing rod is rotatably mounted in the side plates 1 and 2 of the reel casing. The reel spool which is located within the casing between the side plates 1 and 2 is rotatably mounted on the cross shaft 7 and it is connected to the cross shaft when the manually operated friction clutch, to be hereinafter described, is applied. This spool in the present instance comprises the following elements:

A cylindrical sleeve 8 of large diameter connects end plates 9 and 10, which end plates are developed into flanges 11 and 12 extending beyond the cylindrical sleeve 8 for retaining the line wound on the spool.

The inner faces of the side plates 1 and 2 of the casing are provided with inwardly directed annular flanges 13 and 14 which overlap and serve as guards for the peripheral edges of the spool flanges 11 and 12 to prevent the fish line from riding over the flanges.

The side plate 1 of the casing has a central recess 15 within which is located a one-way brake for locking the cross shaft to the casing against reverse rotation. This one-way brake is herein represented as a roller brake, the rollers 16 thereof working between the side walls of the recess 15 and the cam walls on the inner face of a disc 17 which is fixed to the cross shaft 7 on which the spool is rotatably mounted.

A hand crank 18 is pivoted eccentrically on the disc 17 as follows:

The hub of the hand crank has an annular recess 19 and a hollow stud 20, which stud is mounted in a projection 17* on the outer face of the disc 17. A coil spring 21 is located in said recess 19 and engages the projection 17* and the hand crank to normally yieldingly hold the hand crank in its retracted position with its shank extending across the axis of the winding spool. A cover 22 serves to close the outer side of this recess 19.

The manually operated friction clutch for connecting the spool to the cross shaft is herein shown as a radially movable clutch carried by the cross shaft, which clutch is located within the cylindrical sleeve 8 of the spool, said friction clutch comprising a shoe 23 yieldingly held away from its frictional contact with the inner face of the spool sleeve 8 by spring means 24 carried by a sleeve 25 fixed to the cross shaft 7, as, for instance, by the set screw 26.

The manually operated friction clutch control means is herein shown as comprising a finger slide 27 on the top of the front tubular extension 3 of the reel casing in position to be readily operated by the thumb of the user, which slide may be operatively connected to the friction clutch by the following elements:

A rod 28 within the said tubular front extension 3 connects the finger slide 27 with a bar 29 slidable on the side plate 2 of the reel casing, which bar is provided with a yielding cam extension 30 engaging the outer arm of a rock lever 31 pivoted in the side walls of a housing 32 secured to the outer face of the side plate 2.

The inner arm of this rock lever 31 engages the outer end of a pin 33 slidable lengthwise in the cross shaft 7, the other end of which pin engages one arm of a bell crank lever 34 pivoted on the sleeve 25 fixed to the cross shaft. The other arm of this bell-crank lever 34 engages a projection 35 on the clutch shoe 23.

To facilitate the handling of the reel when combined with its rod I have provided the reel casing with a hollow hand grip 36 extending along the bottom of the front extension 3 from the side plates 1 and 2, which hand grip serves also as a brace for the said extension 3. The channel through the grip serves as a passage for the fish line on its way to and from the spool.

It will be observed that the side plates 1 and 2, the front and rear extensions 3 and 4, the flanges 13 and 14 and the hand grip 36 are all formed integral, thereby materially simplifying the structure as well as rendering the same much more rigid than where the several parts have to be secured together by additional devices.

It will be seen that I have provided two very effective controls for the spool, one for the unwinding of the spool and one for the winding of the same.

With reference to the winding control it will be seen that when there is no load on the line the line may be drawn in rapidly because of the large diameter of the spool sleeve on which the line is wound and also because of the short throw of the normally retracted hand crank. It will be noted that as the load on the line increases the throw of the hand crank is automatically increased because of its eccentric and yielding connection with the cross shaft 7 by the coil spring 21 and because of the normal position of the hand crank across the axis of the spool. It will also be observed that the usual geared connection between the hand crank and the spool is eliminated. It will furthermore be seen that the one-way brake will automatically lock the cross shaft to the casing to prevent the reverse rotation of the cross shaft, which one-way brake is effectively mounted within the central recess 15 in the side plate 1 of the reel casing.

With reference to the manually operated means for controlling the friction clutch to connect the spool to the cross shaft it will be seen that when the finger slide 27 is fully advanced the spool may unwind freely. As the slide 27 is retracted the frictional effect on the spool is increased up to the full capacity of the friction clutch.

It will be noted that a yielding operative connection is provided between the finger slide 27 and the friction clutch, i. e., the cam extension 30 of the bar 29, thereby preventing a harsh or undue binding effect of the clutch shoe when moved radially into contact with the inner wall of the cylindrical sleeve 8 by the retraction of the finger slide 27.

It is evident that various changes may be resorted to in the construction, form and arrangement of the several parts without departing from the spirit and scope of my invention, and hence I do not intend to be limited to the particular embodiment herein shown and described.

What I claim is:

1. In a fish line reel, a casing, a shaft rotatable therein, a hollow spool rotatable on the shaft, a friction clutch attached to the shaft and located within the spool, means for bringing the friction clutch into more or less frictional contact with the spool, and a variable throw hand crank carried by the shaft.

2. In a fish line reel, a casing, a cross shaft rotatable therein, a hollow spool rotatable on the cross shaft, means for locking the cross shaft to the casing against reverse rotation, a friction clutch located within the spool and attached to the cross shaft, means for bringing the friction clutch into more or less frictional contact with the spool, and a variable throw hand crank carried by the cross shaft.

3. In a fish line reel, a casing, a cross shaft rotatable therein, a spool rotatable on the cross shaft, a friction clutch carried by the cross shaft, means for bringing the friction clutch into more or less frictional contact with the spool, and an eccentrically mounted hand crank yieldingly carried by the cross shaft.

4. In a fish line reel, a casing, a cross shaft rotatable therein, a spool rotatable on the cross shaft, means for locking the cross shaft to the casing against reverse rotation, a friction clutch carried by the cross shaft, means for bringing the friction clutch into more or less frictional contact with the spool, and an eccentrically mounted hand crank yieldingly carried by the cross shaft.

5. In a fish line reel, a casing, a cross shaft rotatable therein, a hollow spool rotatable on the cross shaft, a radially movable friction clutch attached to the cross shaft and located within the spool, and manually operated means for bringing the friction clutch into more or less frictional contact with the spool.

6. In a fish line reel, a casing, a longitudinally grooved shaft rotatable therein, a hollow spool rotatable on the shaft, a radially movable friction clutch attached to the shaft and located within the spool, and manually operated means for bringing the clutch into more or less frictional contact with the spool, said means including mechanisms external to and within the spool and a slidable member in the shaft groove for connecting said mechanisms.

7. In a fish line reel, a casing, a cross shaft rotatable therein, a hollow spool rotatable on the cross shaft, an internal friction sleeve forming a part of the hollow spool, a radially movable friction clutch carried by the cross shaft and located within the spool sleeve, and manually operated means for bringing the friction clutch into more or less frictional contact with the spool sleeve.

8. In a fish line reel, a casing, a cross shaft rotatable therein, a hollow spool rotatable on the cross shaft, a one-way brake interposed between the cross shaft and casing to lock the cross shaft against reverse rotation, an internal friction sleeve forming a part of the spool, a radially movable friction clutch carried by the cross shaft and located within the spool sleeve, and manually operated means for bringing the friction clutch into more or less frictional contact with the spool sleeve.

9. In a fish line reel, a casing having side plates and front and rear tubular extensions fitted to receive the fore and butt portions of a fishing rod, a cross shaft rotatably mounted in the side plates, a hollow spool rotatable on the cross shaft, a friction clutch carried by the cross shaft and located within the spool, and a finger slide mounted on the front tubular extension and connected to the friction clutch for bringing the friction clutch into more or less frictional contact with the spool.

10. In a fish line reel, a casing having side plates, and front and rear tubular extensions fitted to receive the fore and butt portions of a fishing rod, a cross shaft rotatably mounted in the side plates, a hollow spool rotatable on the cross shaft, an internal friction sleeve forming a part of the hollow spool, a friction clutch carried by the cross shaft and located within the spool sleeve, a finger slide mounted on the front tubular extension and means connecting the finger slide to the friction clutch for bringing the friction clutch into more or less frictional contact with the spool sleeve.

11. In a fish line reel, a casing having side plates and front and rear tubular extensions fitted to receive the fore and butt portions of a fishing rod, a cross shaft rotatably mounted in the side plates, a hollow spool rotatable on the cross shaft, means for locking the cross shaft to one of the side plates against reverse rotation, a friction clutch carried by the cross shaft and located within the spool, and a finger slide mounted on the front tubular extension and connected to the friction clutch for bringing the friction clutch into more or less frictional contact with the spool.

12. In a fish line reel, a casing having side plates and front and rear tubular extensions fitted to receive the fore and butt portions of a fishing rod, a cross shaft rotatably mounted in the side plates, a hollow spool rotatable on the cross shaft, an internal friction sleeve forming a part of the hollow spool, means for locking the cross shaft to one of the side plates against reverse rotation, a friction clutch carried by the cross shaft and located within the spool sleeve, a finger slide mounted on the front tubular extension and means connecting the finger slide to the friction clutch for bringing the friction clutch into more or less frictional contact with the spool sleeve.

13. In a fish line reel, a casing having side plates and front and rear tubular extensions fitted to receive the fore and butt portions of a fishing rod, a cross shaft rotatably mounted in the side plates, a hollow spool rotatable on the cross shaft, a friction clutch carried by the cross shaft and located within the spool, and a finger slide mounted on the front tubular extension and yieldingly connected to the friction clutch for bringing the friction clutch into more or less frictional contact with the spool.

14. In a fish line reel, a casing having side plates and front and rear tubular extensions fitted to receive the fore and butt portions of a fishing rod, a cross shaft rotatably mounted in the side plates, a hollow spool rotatable on the cross shaft, an internal friction sleeve forming a part of the hollow spool, a friction clutch carried by the cross shaft and located within the spool sleeve, a finger slide mounted on the front tubular extension and means yieldingly connecting the finger slide to the friction clutch for bringing the friction clutch into more or less frictional contact with the spool sleeve.

15. In a fish line reel, a casing having side plates and front and rear tubular extensions fitted to receive the fore and butt portions of a fishing rod, a cross shaft rotatably mounted in the side plates, a hollow spool rotatable on the cross shaft, means for locking the cross shaft to one of the side plates against reverse rotation, a friction clutch carried by the cross shaft and located within the spool, and a finger slide mounted on the front tubular extension and yieldingly connected to the friction clutch for bringing the friction clutch into more or less frictional contact with the spool.

16. In a fish line reel, a casing having side plates and front and rear tubular extensions fitted to receive the fore and butt portions of a fishing rod, a cross shaft rotatably mounted in the side plates, a hollow spool rotatable on the cross shaft, an internal friction sleeve forming a part of the hollow spool, means for locking the cross shaft to one of the side plates against reverse rotation, a friction clutch carried by the cross shaft and located within the spool sleeve, a finger slide mounted on the front tubular extension and means yieldingly connecting the finger slide to the friction clutch for bringing the friction clutch into more or less frictional contact with the spool sleeve.

17. In a fish line reel, a spool having flanged end plates, a casing therefor comprising spaced side plates, the inner faces of which are provided with inwardly directed annular flanges which overlap and serve as guards for the peripheral edges of the flanged end plates of the spool, and front and rear tubular extensions located beyond the inwardly directed annular flanges and fitted to receive the fore and butt portions of a fishing rod, the casing side plates, the inwardly directed annular flanges and the front and rear tubular extensions being all formed integral.

18. In a fish line reel, a spool, a casing therefor comprising spaced side plates, front and rear tubular extensions, and a hollow hand grip extending from the side plates along the under side of the front extension, said side plates, front and rear tubular extensions and hand grip being formed integral.

19. In a fish line reel, a spool having end plate flanges, a casing for the spool comprising spaced side plates having inwardly directed annular flanges overlapping the peripheral edges of the spool flanges, front and rear tubular extensions, and a hollow hand grip extending along the under side of the front tubular extension, said side plates, inwardly directed annular flanges, front and rear tubular extensions and hollow hand grip being all formed integral.

20. A fish line reel comprising a spool, a casing therefor, a friction clutch located within the spool, a finger slide on the casing, and means operatively connecting the friction clutch and slide, said means comprising a bell crank lever within the spool, a second lever on the casing, an axially movable pin operatively connecting the said levers, a slide bar on the casing engaging the second lever, and a rod operatively connecting the slide bar with the finger slide.

21. A fish line reel comprising a spool, a casing therefor, a friction clutch located within the spool, a finger slide on the casing, and yielding means operatively connecting the friction clutch and slide, said means comprising a bell crank lever within the spool, a second lever on the casing, an axially movable pin operatively connecting the said levers, a slide bar on the casing having a cam spring engaging the second lever, and a rod operatively connecting the slide bar with the finger slide.

FREDERICK C. GRISWOLD.